United States Patent Office 3,257,279
Patented June 21, 1966

3,257,279
WATER-SOLUBLE MEDIUM FOR TISSUE INFILTRATING AND EMBEDDING
Philip Schain, 126 Silver Lake Road, Staten Island, N.Y.
No Drawing. Filed July 31, 1962, Ser. No. 213,623
7 Claims. (Cl. 167—84.5)

This invention relates to a chemical composition adapted and intended primarily for use as water-soluble hardening agent for tissues, or in the language of the histologic art—as a water soluble tissue infiltrating and embedding medium or composition. More particularly, the invention relates to a low melting, solid, water soluble composition having the capacity in the molten state to readily penetrate both aqueous and fat containing tissues, while setting to a firm, slightly elastic, and essentially non-hygroscopic consistency, thereby greatly facilitating the preparation of tissue sections for biopsic examination.

The normal and time honored procedure for preparing tissue sections for biopsic examination is the paraffin block method. A typical procedure for preparing paraffin blocks from which to cut tissue sections is described in "Histopathology Technic" by Lillie and involves a sequence of steps requiring about 36 hours to carry to completion.

In this procedure, a tissue sample is immersed successively in 70% alcohol for 16 hours, 85% alcohol for 8 hours, 95% alcohol for 16 hours, and 100% alcohol for 2 hours (to remove water from the tissue without changing the cell structure). The dehydrated tissue is then immersed successively in a 100% alcohol and benzene mixture for 1 hour, pure benzene for ½ hour, and fresh benzene for another ½ hour (to prepare the tissue for penetration by paraffin). The benzene saturated tissue is then placed in molten paraffin at 60° C. for ½ hour, followed by three ½ hour immersions in fresh paraffin before it is placed in a block containing fresh paraffin and allowed to cool and harden preparatory to cutting thin sections or slices.

After cutting the sections, and in order to remove the paraffin, they must be passed through several short immersions in benzene and then alcohol (requiring about two hours), before they are ready for immersion in water, staining, and mounting on slides for examination.

With special equipment for automatically making the numerous transfers of tissue, the time for preparing the paraffin block can be reduced from about 36 hours to a minimum of about 16 hours. Even this involves an objectionably long delay in the preparing of tissue sections for biopsic study.

With the new water-soluble composition of the present invention, having the capacity to penetrate both aqueous and fat containing tissues, the time for blocking a tissue sample preparatory to cutting of slices or sections can be reduced to about four hours, i.e. three one-hour immersions in the molten composition followed by blocking in fresh composition. This time can be further reduced to about two hours, since if done under vacuum, the three one-hour immersions can be reduced to about 20 minute immersions. In addition, the overall time for preparing sections for enumeration is further reduced by the fact that the sections can be placed directly in water to dissolve out the tissue hardening composition.

It has been suggested as far back as about 1950 that polyethylene glycols having a molecular weight of about 1000 to 1500 could be used as water-soluble tissue hardening agents. They have been found quite unsatisfactory, however, since they do not adequately penetrate the tissues. In addition, apparently due to the hygroscopic nature of these polyethylene glycols, they vary markedly and unpredictably in hardness and elasticity with change in temperature and humidity, with the result that sections cut from tissue blocked with polyethylene glycol are not uniform in thickness, firmness or elasticity.

The new compositions of the present invention overcome these disadvantages. The essentially non-hygroscopic wax-like material penetrates well into both aqueous and fat containing tissues, and blocked tissue can be cut into thin, uniform sections which have a firmness and flexibility permitting them, if desired, to remain attached to each other to form long ribbons (important in serial studies of tissue.)

The new composition in accordance with the present invention comprises predominately a mixture of nonionic alkyl phenol ethylene oxide condensates having ethylene oxide chains of substantially differing lengths into which are incorporated small amounts of fat soluble wax, water-soluble wax, and film forming plastic. More specifically, the composition can be described with reference to the following tabulation:

| Components: | Percent by weight |
|---|---|
| (1) Water-soluble nonionic surface active agent of solid consistency, such as nonyl phenol ethylene oxide condensates, or mixtures thereof containing 20 to 40 mols of ethylene oxide per mol of nonyl phenol | 80–90 |
| (2) Water-soluble nonionic surface active agent of semi-solid consistency, such as nonyl phenol ethylene oxide condensates or mixtures thereof containing about 12 to 16 mols of ethylene oxide per mol of nonyl phenol | 4–9 |
| (3) Fat soluble (and water insoluble) nonionic surface active agent of normally liquid consistency, such as nonyl phenol ethylene oxide condensates, or mixtures thereof, containing about 4 to 7 mols of ethylene oxide per mol of nonyl phenol | 1–4 |
| (4) Paraffin | 0.4–1.6 |
| (5) A paraffin miscible natural wax, such as carnauba wax, beeswax, or a mixture thereof | 0.1–0.4 |
| (6) Plastic film forming agent, such as nitrocellulose, methyl methacrylate resin, or polyvinyl chloride | 0.1–0.4 |

(The plastic materials are utilized as about 20% solutions in appropriate solvents, such as ether-alcohol for the nitrocellulose, and cyclohexanone for the methyl methacrylate resin, or polyvinyl chloride, the solvent being substantially evaporated when heating and mixing with other components.)

| | |
|---|---|
| (7) Water-soluble wax, such as polyethylene glycols and mixtures thereof, having a molecular weight within the range of about 1000 to 20,000, and preferably about 4,000 | 1–5 |
| (8) Optional and special purpose components: | |
| (a) For increasing the water-solubility of the composition, a highly water-soluble nonionic surface active agent, such as nonyl phenol ethylene oxide condensates, or mixtures thereof, containing about 9 to 11 mols of ethylene oxide per mol of nonyl phenol | 1–2 |
| (b) For increasing the fat solubility of the composition, a fat soluble higher alcohol, such as trimethyl nonanol | 1–2 |

In preparing the composition, the water-soluble components 1, 2, 7, and 8(a) if present, are mixed together at about 60° C. The fat soluble components 3, 4, 5, 6 and 8(b) if present, are separately mixed together, and this mixture is then added to the mixture of heated water-soluble components and heating is continued until the entire composition is clear. Upon cooling, the composition should solidify at a temperature within the range of about 40 to 45° C.

Since all human tissue contains some fat predictably present as a normal constituent, or unpredictably found as result of disease, it is considered most practical to provide a standard or general purpose composition which will have good penetrating powers for the mixed aqueous and fat containing tissue normally encountered. Such a general purpose composition is shown in the following example, but it is to be understood that this example is given by way of illustration and not of limitation.

*Example*

Components: Percent by weight
(a) Nonyl phenol ethylene oxide condensate containing 20 mols of ethylene oxide per mol of nonyl phenol _____ 87.6
(b) Nonyl phenol ethylene oxide condensate containing 15 mols of ethylene oxide per mol of nonyl phenol _____ 8.2
(c) Nonyl phenol ethylene oxide condensate containing 4 mols of ethylene oxide per mol of nonyl phenol _____ 1.2
(d) A mixture of 12 parts of paraffin and 1 part of carauba wax _____ 0.8
(e) Nitrocellulose (supplied as a solution, 20% concentration, in 50% ethanolether) _____ 0.2
(f) Polyethylene glycol having a molecular weight of about 3700 _____ 2

In preparing this composition, a mixture of components a, b and f above is prepared with heating at about 60° C. A second mixture of components c, d and e above is made with heating at about 60° C. The two mixtures are then combined, and heating at about 60° C. is continued until a clear solution is obtained. The solution is then allowed to cool and becomes solid at about 42° C.

It should be understood that the composition can be varied in hardness, elasticity, degree of hygroscopic activity and penetrability into aqueous or fatty tissue by suitably varying the nature and amount of the several components within the ranges previously described. Examples of typical variations which can be made in the composition will be apparent from the following:

(1) To increase hardness in the composition, utilize as component 1 the longer ethoxide chain ethylene oxide condensates, or as component 7, a higher molecular weight polyethylene glycol. Hardness can also be increased by increasing the percentage of paraffin and by increasing the proportion of carnauba wax to paraffin.

(2) To increase elasticity the amount of the film forming plastic, component 6, can be increased, or the proportion of the paraffin and wax mixture (components 4 and 5) can be increased with a simultaneous increase in the proportion of component 3, and decrease in the proportion of component 1. Another way to increase elasticity is to utilize beeswax rather than carnauba wax in combination with the paraffin.

(3) To decrease hygroscopic activity, the modifications described in 1 and 2 above can be employed. The effect on hygroscopic activity of increasing the proportion of component 1 having a high ethylene oxide content is enhanced by a corresponding decrease in the proportion of component 2.

(4) To increase the penetrability into aqueous tissue, the proportion of components 3, 4, 5 and 6 can be decreased with a corresponding increase in component 2, or addition of component 8(a); or one can utilize as component 7, a lower molecular weight polyethylene glycol.

(5) To increase the penetrability into fatty tissue, the proportion of component 3 may be increased, preferably by adding nonyl phenol ethylene oxide condensate containing 6 to 7 mols of ethylene oxide per mol of nonyl phenol; or a fat soluble alcohol, component 8(b), can be included.

In any variation of the composition of the type above described, it should be borne in mind that the final product should have a melting point within the practical range of about 40 to 45° C., and should be readily soluble in water. A practical test of solubility is to place in water a thin slice of solidified composition approximately six microns thick. Such a sample should completely dissolve without agitation in 5 to 60 seconds. It will also be recognized that in adapting the composition to preferred forms for use with particular type tissues, such as liver tissue, muscle tissue, etc., factors such as hardness and elasticity may have to be varied according to the characteristics of the particular tissue. For example, an optimum composition for use with liver tissue may be somewhat harder and less flexible than an optimum composition for use with muscle tissue. As previously pointed out, however, a general purpose composition of the type shown in the illustrative example can be effectively used with a wide variety of different types of human tissue when preparing sections for biopsic examination.

The ability of the new composition in the molten state to completely penetrate both aqueous and fatty tissue openings which may be only a fraction of a micron in size, and at the same time to be completely removed from the tissue when thin, impregnated sections or slices are placed in water, appears to be due to the unique solubilizing effect of the water-soluble nonionic surfactants on the normally water insoluble components either directly, or indirectly. It appears for example, that the fat soluble (or water insoluble) nonionic surfactants are completely soluble in the water-soluble nonionic surfactants, and at the same time, have the capacity to dissolve the fatty and resinous components and carry them into solution in the water-soluble nonionic surfactants, to provide an overall composition which is completely soluble in water, and remains completely water-soluble when impregnated in tissue specimens.

Various changes and modifications in the composition herein disclosed will occur to those skilled in the art, and to the extent that such changes and modifications are embraced by the appended claims, it is to be understood that they constitute part of the invention.

I claim:

1. A water-soluble tissue infiltrating and embedding composition facilitating rapid preparation of tissue sections for biopsic study, said composition consisting essentially of 80 to 90% by weight of nonyl phenol ethylene oxide condensate containing 20 to 40 mols of ethylene oxide per mol of nonyl phenol, 4 to 9% of nonyl phenol ethylene oxide condensate containing 12 to 16 mols of ethylene oxide per mol of nonyl phenol, 1 to 4% of nonyl phenol ethylene oxide condensate containing 4 to 7 mols of ethylene oxide per mol of nonyl phenol, 0.4 to 1.6% of paraffin, 0.1 to 0.4% of a natural wax selected from the group consisting of carnauba wax, beeswax and mixtures thereof, 0.1 to 0.4% of plastic film forming agent selected from the group consisting of nitrocellulose, methyl methacrylate resin and polyvinyl chloride, and 1 to 5% of polyethylene glycol having a molecular weight within the range of 1000 to 20,000, and said composition in the molten state being a clear solution capable of penetrating both aqueous and fatty tissues, and setting at about 40 to 45° C. to a water-soluble wax-like solid.

2. A water-soluble tissue infiltrating and embedding composition as defined in claim 1, containing, as an agent for increasing the fat solubility, 1 to 2% of trimethyl noethylene oxide condensate containing 9 to 11 mols of ethylene oxide per mol of nonyl phenol.

3. A water-soluble tissue infiltrating and embedding composition as defined in claim 1, containing, as an agent for increasing the fat solubility, 1 to 2% of trimethyl nonanol.

4. A water-soluble tissue infiltrating and embedding composition as defined in claim 1 wherein the polyethylene glycol has a molecular weight of about 4000.

5. A water-soluble tissue infiltrating and embedding composition facilitating rapid preparation of tissue sections for biopsic study, said composition being in the molten state a clear solution capable of penetrating both aqueous and fatty tissues and setting at about 42° C. to a water-soluble wax-like solid, and said composition consisting, by weight, of approximately 87.6% nonyl phenol ethylene oxide condensate containing 20 mols of ethylene oxide per mol of nonyl phenol, 8.2% nonyl phenol ethylene oxide condensate containing 15 mols of ethylene oxide per mol of nonyl phenol, 1.2% nonyl phenol ethylene oxide condensate containing 4 mols of ethylene oxide per mol of nonyl phenol, 0.8% of a mixture of 12 parts paraffin and 1 part carnauba wax, 0.2% nitrocellulose, and 2% polyethylene glycol having a molecular weight of about 3700.

6. A water-soluble tissue infiltrating and embedding composition facilitating rapid preparation of tissue sections for biopsic study, said composition consisting essentially of 80 to 90% by weight of a water-soluble nonionic nonyl phenol ethylene oxide condensate of solid consistency, 4 to 9% of a water-soluble nonionic nonyl phenol ethylene oxide condensate of semi-solid consistency, 1 to 4% of a fat soluble and water-insoluble nonionic nonyl phenol ethylene oxide condensate of normally liquid consistency, 0.4 to 1.6% paraffin, 0.1 to 0.4% of paraffin soluble natural wax selected from the group consisting of carnauba wax, beeswax, and mixtures thereof, 0.1 to 0.4% of plastic film forming agent selected from the group consisting of nitrocellulose, methylmethacrylate resin and polyvinyl chloride, and 1 to 5% of polyethylene glycol having a molecular weight within the range of 1000 to 20,000, and said composition in the molten state being a clear solution capable of penetrating both aqueous and fatty tissues, and setting at about 40 to 45° C. to a water-soluble wax-like solid.

7. A water-soluble tissue infiltrating and embedding composition as defined in claim 6, containing, as an agent for increasing water solubiliy, 1 to 2% of a normally liquid water-soluble nonionic nonyl phenol ethylene oxide condensate.

References Cited by the Examiner

UNITED STATES PATENTS

| | | | |
|---|---|---|---|
| 1,989,683 | 2/1935 | Cornwell | 106—195 |
| 2,792,314 | 5/1957 | Brown | 106—195 |
| 2,971,930 | 2/1961 | Glade | 260—28 |
| 3,012,980 | 12/1961 | Dereich | 260—28 |

JULIAN S. LEVITT, *Primary Examiner.*

MORRIS LIEBMAN, FRANK CACCIAPAGLIA, Jr.,
*Examiners.*

DONALD J. ARNOLD, ANNA P. FAGELSON, SAM ROSEN, *Assistant Examiners.*